United States Patent [19]

Katner

[11] 3,895,027

[45] July 15, 1975

[54] PROCESS FOR PREPARING PYRAZOLE-3-CARBOXYLIC ACIDS

[75] Inventor: Allen S. Katner, Indianapolis, Ind.

[73] Assignee: Eli Lilly and Company, Indianapolis, Ind.

[22] Filed: Apr. 12, 1974

[21] Appl. No.: 460,645

[52] U.S. Cl. .................. 260/310 R; 260/251 QB
[51] Int. Cl. ............................ C07d 49/18
[58] Field of Search ................ 260/310 R, 251 QB

[56] References Cited
OTHER PUBLICATIONS

J. Am. Chem. Soc., Vol. 72, pp. 4887–4890 (1950).

Joule et al., "Heterocyclic Chemistry,", page 129, published by Van Nostrand Reinhold Co., N.Y. (1972) QD400 J59.

*Primary Examiner*—Donald B. Moyer
*Attorney, Agent, or Firm*—William E. Maycock; Everet F. Smith

[57] ABSTRACT

Pyrazole-3-carboxylic acids, useful as complement inhibitors, are prepared by the alkaline hydrolysis of pyrazolo[1,5-c]quinazolin-5(6H)-one-2-carboxylic acids or esters thereof.

6 Claims, No Drawings

PROCESS FOR PREPARING PYRAZOLE-3-CARBOXYLIC ACIDS

BACKGROUND OF THE INVENTION

This invention relates to pyrazole-3-carboxylic acids. More particularly, this invention relates to a process for preparing pyrazole-3-carboxylic acids useful as complement inhibitors.

Malfunction of the serum complement system is known to be involved in glomerulonephritis and is believed to be involved in serum sickness and in certain inflammatory diseases such as rheumatoid arthritis. Consequently, an effective complement inhibitor would substantially block the malfunction of the serum complement system and hence would be useful in the treatment of such diseases.

SUMMARY OF THE INVENTION

In accordance with the present invention, novel pyrazole-3-carboxylic acids having the general formula,

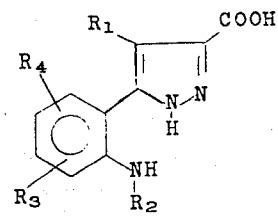

are obtained by the process which comprises hydrolyzing under alkaline conditions a pyrazolo[1,5-c]quinazolin-5(6H)-one having the general formula,

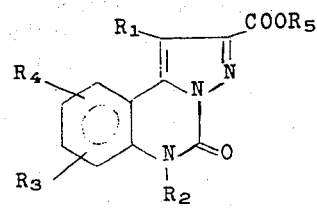

wherein $R_1$ is a monovalent group selected from the group consisting of hydrogen, $C_1$–$C_4$ alkyl, phenyl, and monosubstituted phenyl in which the substituent is $C_1$–$C_3$ alkyl, $C_1$–$C_3$ alkoxy, fluoro, chloro, or bromo; $R_2$ is a monovalent group selected from the group consisting of methyl, phenyl, benzyl, and monosubstituted phenyl and benzyl in which the substituent is methyl, trifluoromethyl, methoxy, fluoro, chloro, bromo, or methylsulfonyl; $R_3$ and $R_4$ are monovalent groups independently selected from the group consisting of hydrogen, methyl, methoxy, fluoro, chloro, and bromo, with the limitation that $R_3$ and $R_4$ must be different unless each of $R_3$ and $R_4$ is hydrogen; and $R_5$ is hydrogen or $C_1$–$C_3$ alkyl.

The hydrolysis is carried out in an aqueous medium in the presence of a strong base and at a temperature of from about 40°C. to the reflux temperature of the reaction medium. When hydrolysis is complete, the free acid is obtained by making the reaction medium acidic.

The novel pyrazole-3-carboxylic acids prepared by the process of the present invention are useful as complement inhibitors.

Detailed Description of the Invention

The process of the present invention can be represented by the following equation:

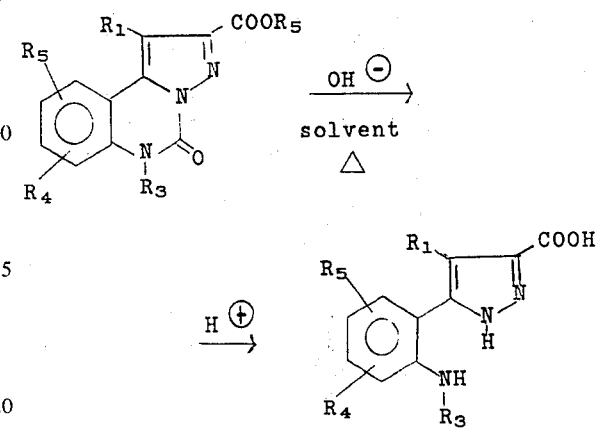

While water alone can be employed as a reaction medium, an aqueous-organic solvent medium is preferred in order to increase the solubility of the pyrazolo[1,5-c]quinazolin-5(6H)-one. In general, any organic solvent can be used which is water-soluble and inert under the conditions of the reaction. Examples of such solvents include ketones, such as acetone and methyl ethyl ketone; alkanols, such as methanol, ethanol, propanol, and isopropanol; cyclic ethers, such as tetrahydrofuran, 1,3-dioxane, and 1,4-dioxane; miscellaneous solvents such as dimethyl sulfoxide; and the like. The alkanols are preferred, with ethanol being most preferred. The ratio of water to organic solvent is not critical. Conveniently, the water:organic solvent ratio (v/v) will be 1:1, although more or less organic solvent can be employed if desired. The total amount of water or aqueous organic solvent employed also is not critical, provided adequate agitation can be maintained. Typically, the total amount of solvent will constitute from about 75 to about 95 percent by weight of the total reaction mixture. As indicated hereinbefore, the hydrolysis is carried out in the presence of a strong base which can be inorganic or organic and which is significantly soluble in water. Examples of such bases include, among others, alkali metal hydroxides, such as lithium hydroxide, sodium hydroxide, potassium hydroxide, rubidium hydroxide, and cesium hydroxide; alkali metal carbonates, such as lithium carbonate, sodium carbonate, potassium carbonate, rubidium carbonate, and cesium carbonate; alkaline earth metal hydroxides, such as calcium hydroxide, strontium hydroxide, and barium hydroxide; other nontransition metal hydroxides, such as thallous hydroxide; quaternary ammonium hydroxides, such as ammonium hydroxide, tetramethylammonium hydroxide, tetraethylammonium hydroxide, methyltriethylammonium hydroxide, and dimethyldiethylammonium hydroxide; and the like. Preferably, the base will be substantially, i.e., greater than about 50 percent, soluble in the reaction medium; most preferably, the base will be completely soluble. The preferred bases are the alkali metal hydroxides, with potassium hydroxide being most preferred. At least two equivalents of base, e.g., two moles of a preferred base, per mole of pyrazolo[1,5-c]quinazolin-5(6H)-one should be used. However, an excess of base is preferred, which excess can range from about 3.5 equivalents to about 20 equivalents or more of base per mole of pyrazolo[1,5-c]quinazolin-5(6H)-one. The hydrolysis reaction is carried out at a temperature of from about 40°C. to the reflux temperature of the reaction medium, with heating at reflux being preferred. The reaction time is not critical and can vary from about 15 minutes to about 12 hours. Preferably, the reaction time will be in the range of from about 30 minutes to about 6 hours. When hydrolysis is complete, the pyrazole-3-carboxylic acid is isolated by rendering the reaction medium acidic according to well-known procedures. Typically, the reaction mixture is cooled and made strongly acidic to precipitate the pyrazole-3-carboxylic acid which is isolated and purified in the usual manner.

Examples of pyrazole-3-carboxylic acids which are obtained by means of the process of the present invention include, among others, 5-[2-(Methylamino)phenyl]pyrazole-3-carboxylic acid, 5-(2-Anilinophenyl)pyrazole-3-carboxylic acid, 4-Ethyl-5-[2-fluoroanilino)phenyl]pyrazole-3-carboxylic acid, 5-[2-(Benzylamino)-3-bromophenyl]pyrazole-3-carboxylic acid, 5-[2-(4-Chlorobenzylamino)phenyl]pyrazole-3-carboxylic acid, 4-Propyl-5-[2-(4-chlorobenzylamino)phenyl]pyrazole-3-carboxylic acid, 4-Phenyl-5-[2-(4-chlorobenzylamino)phenyl]pyrazole-3-carboxylic acid, 4-(4-Fluorophenyl)-5-[2-(3-chlorobenzylamino)-4-methylphenyl]pyrazole-3-carboxylic acid, 5-[2-(3-Methylsulfonylbenzylamino)-5-methoxyphenyl]pyrazole-3-carboxylic acid, 5-[2-(4-Chlorobenzylamino)-3-methylphenyl]pyrazole-3-carboxylic acid,  5-[2-(4Chlorobenzylamino)-5-chlorophenyl]pyrazole-3-carboxylic acid, 5-[2-(4-Chlorobenzylamino)-3-methyl-6-chlorophenyl]pyrazole-3-carboxylic acid, 5-[2-(4-Chlorobenzylamino)-4-chloro-5-methoxyphenyl]pyrazole-3-carboxylic acid.

The pyrazolo[1,5-c]quinazolin-5(6H)-ones used as starting materials in the present process are prepared by reacting an activated acetylene with a 3-diazoindol-2(3H)-one, as shown by the following equation:

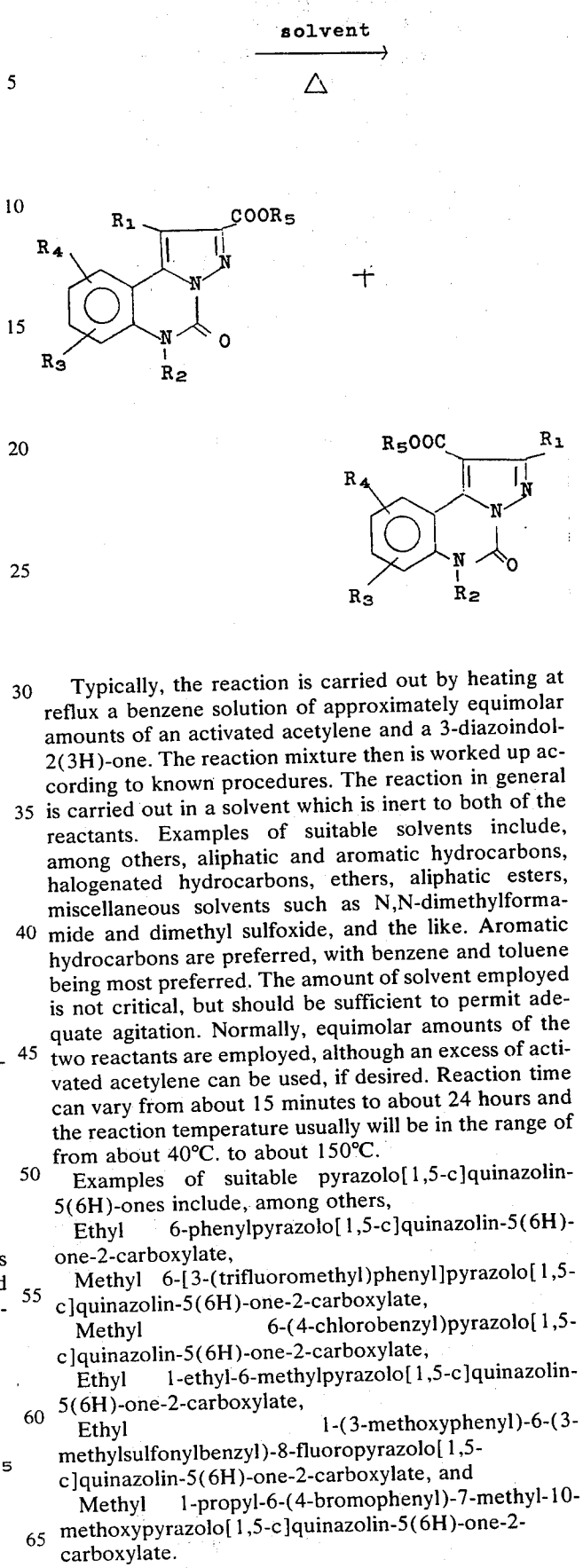

Typically, the reaction is carried out by heating at reflux a benzene solution of approximately equimolar amounts of an activated acetylene and a 3-diazoindol-2(3H)-one. The reaction mixture then is worked up according to known procedures. The reaction in general is carried out in a solvent which is inert to both of the reactants. Examples of suitable solvents include, among others, aliphatic and aromatic hydrocarbons, halogenated hydrocarbons, ethers, aliphatic esters, miscellaneous solvents such as N,N-dimethylformamide and dimethyl sulfoxide, and the like. Aromatic hydrocarbons are preferred, with benzene and toluene being most preferred. The amount of solvent employed is not critical, but should be sufficient to permit adequate agitation. Normally, equimolar amounts of the two reactants are employed, although an excess of activated acetylene can be used, if desired. Reaction time can vary from about 15 minutes to about 24 hours and the reaction temperature usually will be in the range of from about 40°C. to about 150°C.

Examples of suitable pyrazolo[1,5-c]quinazolin-5(6H)-ones include, among others, Ethyl 6-phenylpyrazolo[1,5-c]quinazolin-5(6H)-one-2-carboxylate, Methyl 6-[3-(trifluoromethyl)phenyl]pyrazolo[1,5-c]quinazolin-5(6H)-one-2-carboxylate, Methyl 6-(4-chlorobenzyl)pyrazolo[1,5-c]quinazolin-5(6H)-one-2-carboxylate, Ethyl 1-ethyl-6-methylpyrazolo[1,5-c]quinazolin-5(6H)-one-2-carboxylate, Ethyl 1-(3-methoxyphenyl)-6-(3-methylsulfonylbenzyl)-8-fluoropyrazolo[1,5-c]quinazolin-5(6H)-one-2-carboxylate, and Methyl 1-propyl-6-(4-bromophenyl)-7-methyl-10-methoxypyrazolo[1,5-c]quinazolin-5(6H)-one-2-carboxylate.

In carrying out the above-described reaction, the activated acetylene preferably will not contain a carboxy group; i.e., $R_5$ preferably is not hydrogen. An unprotected carboxy group can react with the diazo moiety of the 3-diazoindol-2(3H)-one to give an ester.

The activated acetylene preferably reacts with the 3-diazoindol-2(3H)-one in such a manner as to give a pyrazolo[1,5-c]quinazolin-5(6H)-one having $R_1$ in the 1-position. However, reverse addition which results in —$COOR_5$ being in the 1-position, can sometimes occur. Hydrolysis of such a reverse addition compound produces a pyrazole-4-carboxylic acid which undergoes intramolecular condensation to give a 1H-pyrazolo[4,3-c]quinol-4(5H)-one of the formula,

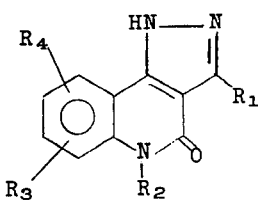

The tendency for the formation of said reverse addition compound increases as the bulk of $R_1$ increases. Therefore, yields of the desired product will be better when $R_1$ is a relatively non-bulky substituent. Nevertheless, the desired pyrazole-3-carboxylic acid of the present invention is easily separated by standard procedures from any 1H-pyrazolo[4,3-c]quinol-4(5H)-one which may be present. However, formation of the 1H-pyrazolo[4,3-c]quinol-4(5H)-one clearly diminishes the yield of pyrazole-3-carboxylic acid and is undesirable.

The activated acetylenes in general are commercially available or readily prepared by well-known procedures. Examples of suitable activated acetylenes include methyl propiolate, ethyl phenylpropiolate, methyl 3-chlorophenylpropiolate, propyl 4-ethoxyphenylpropiolate, methyl 2-butynoate, and the like.

The 3-diazoindol-2(3H)-ones are prepared in accordance with known procedures. See, for example, J. M. Michowski, *Tetrahedron Letters*, 1773 (1967) and M. P. Cava, et al., *J. Am. Chem. Soc.*, 80, 2257 (1958). Briefly, the appropriate isatin compound is treated with p-toluenesulfonylhydrazine. The resulting hydrazone then is treated with aluminum oxide to give the desired 3-diazoindol-2(3H)-one. The preparation of the required isatin compound is well known in the art. The required N-substituted isatin is obtained by either of two routes, depending upon the nature of the desired N-substituent. When the desired isatin nitrogen substituent is alkyl or aralkyl, the N-substituted isatin compound is prepared by N-alkylation of the parent compound with an alkyl or aralkyl halide in the presence of a strong base such as, for example, sodium hydride. An N-aryl isatin, on the other hand, is prepared directly by cyclization with oxalyl chloride of an appropriately-substituted diarylamine.

Examples of suitable 3-diazoindol-2(3H)-ones include, among others,

1-Methyl-3-diazoindol-2(3H)-one, 1-(3-Methoxyphenyl)-3-diazo-5-bromoindol-2(3H)-one, and 1-(4-Chlorobenzyl)-3-diazo-5-methoxy-6-chloroindol-2(3H)-one.

Complement inhibition activity of the compounds of the present invention is determined by the test procedure of W. T. Jackson, et al., reported at the 1971 Annual Meeting of the Federation of American Societies of Experimental Biology and abstracted in *Federation Proceedings*, Vol. 30, No. 2 (March–April), 1971.

The procedure measures inhibition of the functioning of the late components in immune hemolysis. Inhibition of the early components might unfavorably alter susceptibility to infection. To carry out the test, sheep erythrocytes (E) are reacted with rabbit hemolysin (A) to form sensitized cells (EA). The EA cells then are incubated with iodine-oxidized, zymosan-treated human serum to form EAC$\overline{1}$, $\overline{4}$ oxy $\overline{2}$ cells. These latter cells then are lyzed with EDTA-human serum to which a buffer solution containing the test compound has been added. Lysis results in hemoglobin release which is measured colorimetrically after removing unlysed cells by centrifugation. As a control, the procedure is repeated, except that the test compound is omitted. The difference between the extent of hemoglobin release obtained in the control and the extent of hemoglobin release obtained in the presence of the test compound provides a measure of complement inhibition activity, expressed as percent inhibition of lysis. Thus, in any given series of test compounds, increasing activity results in increasing percent inhibition of lysis values. With each test compound, a control is conducted to correct the percent inhibition of lysis value obtained for compound-induced lysis. Such a control is carried out by adding to the EAC$\overline{1}$, $\overline{4}$ oxy $\overline{2}$ cells buffer solution containing the test compound. The extent of hemoglobin release is measured colorimetrically as described above. Such hemoglobin release is compared with the extent of hemoglobin release obtained from 100 percent cell lysis which results upon adding water to the cells. As before, the difference between the two hemoglobin release values provides a measure of compound-induced lysis, expressed as percent compound-induced lysis. The extent of compound-induced lysis is important for two reasons. First, extensive compound-induced lysis adversely affects the accuracy and reliability of the test results. Second, and more important, compound-induced lysis partly or entirely counteracts any activity a compound might have in inhibiting immune hemolysis.

Representative pyrazole-3-carboxylic acid obtained by means of the process of the present invention were tested by means of the above-described procedure. The results are summarized in Table I.

TABLE I

Percent Inhibition of Lysis

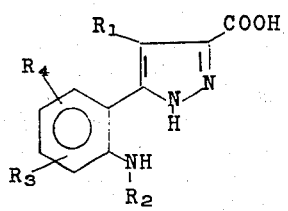

| $R_3$ | $R_4$ | $R_1$ | $R_2$ | | Conc., $\mu g/ml^a$ | Percent Inhibition |
|---|---|---|---|---|---|---|
| H | H | H | —CH$_3$ | | 400 | 51$^b$ |
| H | H | H | | | 400 | 100$^c$ |
| | | | | | 40 | 82 |
| | | | | | 30 | 72 |
| | | | | | 20 | 57 |
| | | | | | 15 | 54 |
| | | | | | 10 | 42 |
| | | | | | 5 | 27 |
| H | H | H | | | 360E | Unknown$^d$ |
| | | | | | 36E | 92 |
| H | H | H | —CH$_2$ | Cl | 400 | Unknown$^d$ |
| | | | | | 40 | 90 |
| | | | | | 30 | 87 |
| | | | | | 20 | 78 |
| | | | | | 15 | 68 |
| | | | | | 10 | 47 |
| | | | | | 5 | 36 |
| H | H | —CH$_3$ | —CH$_2$ | Cl | 360E | Unknown$^d$ |
| | | | | | 36E | 85$^e$ |
| H | H | —C$_2$H$_5$ | —CH$_2$ | Cl | 27E | 74 |
| H | H | —C$_3$H$_7$ | —CH$_2$ | Cl | 360E | Unknown$^d$ |
| | | | | | 40 | 59$^f$ |
| H | H | | —CH$_2$ | Cl | 40 | 64 |
| 3—CH$_3$ | H | H | —CH$_2$ | Cl | 400 | Unknown$^d$ |
| | | | | | 40 | 11.5 |
| H | 5—CH$_3$ | H | —CH$_2$ | Cl | 360E | Unknown$^d$ |
| | | | | | 36E | 31$^g$ |
| H | 5—Cl | H | —CH$_2$ | Cl | 40 | Unknown$^d$ |
| | | | | | 20 | 47$^h$ |
| 3—CH$_3$ | 6—Cl | H | —CH$_2$ | Cl | 360E | 19 |
| 6—Cl | 5—OCH$_3$ | H | —CH$_2$ | Cl | 360E | Unknown$^d$ |
| | | | | | 40 | 65$^b$ |

$^a$Concentration of test compound expressed as $\mu g$ compound per ml total test volume. Many compounds were not soluble at the usual test concentration of 400 $\mu g/ml$. In such cases, the suspension obtained was filtered and the supernatant liquid tested. The concentration of the compound was estimated and is so indicated by an "E" adjacent to the estimated value. Dilutions of this original supernatant liquid to give less concentrated solutions for testing necessarily resulted in solutions having an estimated concentration of test compound.
$^b$1.66 percent compound-induced lysis.
$^c$1.7 percent compound-induced lysis.
$^d$Essentially complete compound-induced lysis.
$^e$0.5 percent compound-induced lysis.
$^f$0.85 percent compound-induced lysis.
$^g$1.25 percent compound-induced lysis.
$^h$0.82 percent compound-induced lysis.

It is seen that the pyrazole-3-carboxylic acids prepared by the process of the present invention are useful in inhibiting complement-induced hemolysis. Consequently, complement inhibitors find practical utility in the treatment of such diseases as glomerulonephritis, serum sickness, and certain inflammatory diseases such as rheumatoid arthritis.

Utilization of a complement inhibitor in general involves administering to a mammal parenterally, preferably intravenously or intraperitoneally, an effective amount of such a compound, typically at a dosage level sufficient to provide a concentration of the compound in the blood of from about 1 to about 400 $\mu/ml$. Such a concentration on the average can be attained by the administration of a dose of from about 0.05 to about 32 mg/kg. The necessary concentration in the blood of complement inhibitor can be achieved by administering a single dose or up to about six smaller doses per day, depending upon the tolerance of the patient to the compound, persistence of the compound in the blood stream, and other factors. Following procedures well known to those skilled in the art, the complement inhibitor normally is formulated into a pharmaceutical composition comprising the active ingredient in association with at least one pharmaceutically acceptable carrier therefor. Such a composition generally is prepared by incorporating the complement inhibitor in a liquid solution or suspension, except that a suspension is not employed for intravenous administration. In such a composition, the complement inhibitor ordinarily will be present in an amount of at least about 0.0001 and not more than about 50 percent by weight, based on the total weight of the composition.

Suitable pharmaceutical carriers are described in E. W. Martin, et. al., "Remington's Pharmaceutical Sciences," 14th Edition, Mack Publishing Company, Easton, Pa., 1965.

In addition to parenteral administration, the complement inhibitor can be administered to a mammal enterally, preferably orally. For enteral administration, the complement inhibitor normally is formulated into a pharmaceutical composition comprising the active ingredient in association with at least one pharmaceutically acceptable carrier therefor. For enteral administration, the complement inhibitor normally is administered at a level of from about 1 to about 200 mg/kg of mammal body weight. Advantageously, the complement inhibitor is formulated in a dosage unit form containing from 5 to about 500 mg, preferably from about 10 to about 150 mg, of active ingredient. Examples of suitable dosage unit forms are tablets, hard or soft gelatin capsules, micro-capsules, and suppositories, as well as drug-dispensing systems comprising the active ingredient contained in a flexible, imperforate polymeric material through which the drug is released slowly by diffusion. More generally, the term "dosage unit form" as used herein means a physically-discrete unit containing the active ingredient, generally in admixture with and/or enclosed by a pharmaceutical carrier, the quantity of active ingredient being such that one or more units normally are required for a single administration.

The present invention is more fully described, without intending to limit it in any manner, by the following examples which illustrate the preparation of certain pyrazole-3-carboxylic acids by means of the process of the present invention. In the examples, all temperatures are in degrees centigrade, unless otherwise specified.

EXAMPLE 1

Preparation of 5-[2-(4-chlorobenzylamino)phenyl]pyrazole-3-carboxylic acid.

A mixture of 40 g of ethyl 6-(4-chlorobenzyl)pyrazolo[1,5-c]quinazolin-5(6H)-one-2-carboxylate, 500 ml of 20 percent aqueous potassium hydroxide, and 500 ml of methanol was heated at reflux for 1 hour. The reaction solution was cooled and distilled under reduced pressure until the volume of the remaining solution was about 500 ml. The solution then was made acidic with concentrated hydrochloric acid. About 40 g of solid precipitated and was isolated by filtration. About 25 g of the solid was dissolved in a large quantity of N,N-dimethylformamide. The resulting mixture was filtered and the filtrate was heated on a steam bath for 24 hours. The solution was distilled until the remaining volume was about 50 ml. The residue was cooled and diluted with water until turbidity persisted. The mixture was cooled at about 5°. The solid which resulted was isolated by filtration. The solid, 11.3 g, mp 122°–131°, was recrystallized twice to give 5.2 g of 5-[2-(4-chlorobenzylamino)phenyl]pyrazole-3-carboxylic acid, mp 135°–139°. The assigned structure was consistent with ultraviolet and nuclear magnetic resonance analyses. The following elemental analysis was obtained:

Calculated for $C_{17}H_{14}ClN_3O_2$: C, 62.30; H, 4.30; N, 12.82. Found: C, 62.50; H, 4.47; N, 12.63.

EXAMPLES 2–13

Following the procedure of Example 1, the following compounds were prepared from the indicated starting materials. The elemental analysis of each compound is given.

5-(2-Methylaminophenyl)pyrazole-3-carboxylic acid, mp 233°–235° (dec.). From ethyl 6-methylpyrazolo[1,5-c]quinazolin-5(6H)-one-2-carboxylate.

Calculated for $C_{11}H_{11}N_3O_2$: C, 60.82; H, 5.10; N, 19.34. Found: C, 60.74; H, 5.21; N, 19.16.

5-(2-Anilinophenyl)pyrazole-3-carboxylic acid, mp 209°–211°. From methyl 6-phenylpyrazolo[1,5-c]quinazolin-5(6H)-one-2-carboxylate.

Calculated for $C_{16}H_{13}N_3O_2$: C, 68.81; H, 4.69; N, 15.05. Found: C, 68.57; H, 4.91; N, 14.79.

5-[2-(3-Trifluoromethylanilino)phenyl]pyrazole-3-carboxylic acid, mp 110°–112°. From methyl 6-[3-(trifluoromethyl)phenyl]pyrazolo[1,5-c]quinazolin-5(6H)-one-2-carboxylate.

Calculated for $C_{17}H_{12}F_3N_3O_2$: C, 58.66; H, 3.71; N, 12.07. Found: C, 59.05; H, 3.73; N, 12.33.

4-Methyl-5-[2-(4-chlorobenzylamino)phenyl]pyrazole-3-carboxylic acid monohydrate. From ethyl 1-methyl-6-(4-chlorobenzyl)pyrazolo[1,5-c]quinazolin-5(6H)-one-2-carboxylate.

Calculated for $C_{18}H_{18}ClN_3O_3$: C, 60.09; H, 5.04; N, 11.68. Found: C, 61.76; H, 4.61; N, 11.98.

4-Ethyl-5-[2-(4-chlorobenzylamino)phenyl]pyrazole-3-carboxylic acid, mp 206°–208° (dec.). From ethyl 1-ethyl-6-(4-chlorobenzyl)pyrazolo[1,5-c]quinazolin-5(6H)-one-2-carboxylate.

Calculated for $C_{19}H_{18}ClN_2O_3$: C, 64.14; H, 5.10; N, 11.81. Found: C, 64.20; H, 4.90; N, 11.93.

4-Propyl-5-[2-(4-chlorobenzylamino)phenyl]pyrazole-3-carboxylic acid, mp 152°–154°. From methyl 1-propyl-6-(4-chlorobenzyl)pyrazolo[1,5-c]quinazolin-5(6H)-one-2-carboxylate.

4-Phenyl-5-[2-(4-chlorobenzylamino)phenyl]pyrazole-3-carboxylic acid, mp 104°–106°. From ethyl 1-phenyl-6-(4-chlorobenzyl)pyrazolo[1,5-c]quinazolin-5(6H)-one-2-carboxylate.

Calculated for $C_{23}H_{18}ClN_3O_2$: C, 68.40; H, 4.49; N, 10.40. Found: C, 68.18; H, 4.30; N, 10.19.

5-[2-(4-Chlorobenzylamino)-3-methylphenyl]pyrazole-3-carboxylic acid hemihydrate, mp 113°–116°. From ethyl 6-(4-chlorobenzyl)-7-methylpyrazolo[1,5-c]quinazolin-5(6H)-one-2-carboxylate.

Calculated for $C_{18}H_{16}ClN_3O_2 \cdot 1/2\ H_2O$: C, 61.63; H, 4.74; N, 11.98. Found: C, 61.63; H, 4.43; N, 11.74.

5-[2-(4-Chlorobenzylamino)-5-methylphenyl]pyrazole-3-carboxylic acid, mp 127°–129°. From methyl 6-(4-chlorobenzyl)-9-methylpyrazolo[1,5-c]quinazolin-5(6H)-one-2-carboxylate.

Calculated for $C_{18}H_{16}ClN_3O_2$: C, 63.25; H, 4.72; N, 12.29. Found: C, 63.53; H, 4.96; N, 12.04.

5-[2-(4-Chlorobenzylamino)-5-chlorophenyl]pyrazole-3-carboxylic acid, mp 287°–289° (dec.). From ethyl 6-(4-chlorobenzyl)-9-chloropyrazolo[1,5-c]quinazolin-5(6H)-one-2-carboxylate.

Calculated for $C_{17}H_{13}Cl_2N_3O_2$: C, 56.37; H, 3.62; N, 11.60. Found: C, 55.91; H, 3.70; N, 10.77.

5-[2-(4-Chlorobenzylamino)-3-methyl-6-chlorophenyl]pyrazole-3-carboxylic acid, mp 89°–91°. From ethyl 6-(4-chlorobenzyl)-7-methyl-10-chloropyrazolo[1,5-c]quinazolin-5(6H)-one-2-carboxylate.

Calculated for $C_{18}H_{15}Cl_2N_3O_2$: C, 57.46; H, 4.02; N, 11.17. Found: C, 57.25; H, 4.22; N, 10.89.

5-[2-(4-Chlorobenzylamino)-4-chloro-5-methoxyphenyl]pyrazole-3-carboxylic acid, mp 137°–139° (dec.). From ethyl 6-(4-chlorobenzyl)-8-chloro-9-methoxypyrazolo[1,5-c]quinazolin-5(6H)-one-2-carboxylate.

Calculated for $C_{18}H_{15}Cl_2N_3O_3$: C, 55.12; H, 3.85; N, 10.71. Found: C, 54.86; H, 3.70; N, 10.63.

What is claimed is:

1. A process for preparing pyrazole-3-carboxylic acids of the formula,

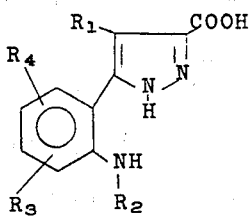

from a pyrazolo[1,5-c]quinazolin-5(6H)-one of the formula,

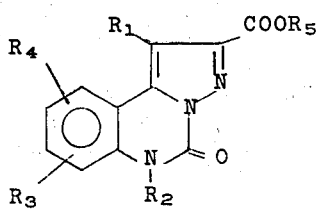

wherein $R_1$ is a monovalent group selected from the group consisting of hydrogen, $C_1$–$C_4$ alkyl, phenyl, and monosubstituted phenyl in which the substituent is $C_1$–$C_3$ alkyl, $C_1$–$C_3$ alkoxy, fluoro, chloro, or bromo; $R_2$ is a monovalent group selected from the group consisting of methyl, phenyl, benzyl, and monosubstituted phenyl and benzyl in which the substituent is methyl, trifluoromethyl, methoxy, fluoro, chloro, bromo, or methylsulfonyl; $R_3$ and $R_4$ are monovalent groups independently selected from the group consisting of hydrogen, methyl, methoxy, fluoro, chloro, and bromo, with the limitation that $R_3$ and $R_4$ must be different unless each of $R_3$ and $R_4$ is hydrogen; and $R_5$ is hydrogen or $C_1$–$C_3$ alkyl; which process comprises the steps of:

A. hydrolyzing the pyrazolo[1,5-c]quinazolin-5(6H)-one in an aqueous medium in the presence of at least two molar equivalents of a strong base and at a temperature of from about 40°C to the reflux temperature of the reaction medium, and B. acidifying the hydrolysis reaction medium to obtain the pyrazole-3-carboxylic acid.

2. The process of claim 1, wherein an aqueous-water-soluble-organic solvent medium is employed.

3. The process of claim 2, wherein the hydrolysis is carried out at the reflux temperature of the reaction medium.

4. The process of claim 2, wherein the organic solvent is ethanol.

5. The process of claim 1, wherein the base is an alkali metal hydroxide.

6. The process of claim 5, wherein the base is potassium hydroxide.

* * * * *

UNITED STATES PATENT AND TRADEMARK OFFICE
CERTIFICATE OF CORRECTION

PATENT NO. : 3,895,027
DATED : July 15, 1975
INVENTOR(S) : Allen S. Katner

It is certified that error appears in the above-identified patent and that said Letters Patent are hereby corrected as shown below:

Column 3, line 45, the term "5-[2-" should appear at the beginning of line 46.

Column 3, line 46, the phrase "(4Chlorobenzylamino)" should read --(4-Chlorobenzylamino)--; thus, line 46 should read as follows:

-- 5-[2-(4-Chlorobenzylamino)-5-chlorophenyl]pyrazole-3- --.

The table at Columns 7 and 8 should read as follows:

| $R_3$ | $R_4$ | $R_1$ | $R_2$ | Conc., µg/ml$^a$ | Percent Inhibition |
|---|---|---|---|---|---|
| H | H | H | -CH$_3$ | 400 | 51$^b$ |
| H | H | H |  | 400<br>40<br>30<br>20<br>15<br>10<br>5 | 100$^c$<br>82<br>72<br>57<br>54<br>42<br>27 |
| H | H | H | 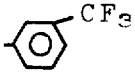 | 360E<br>36E | Unknown$^d$<br>92 |

UNITED STATES PATENT AND TRADEMARK OFFICE
CERTIFICATE OF CORRECTION

PATENT NO. : 3,895,027
DATED : July 15, 1975
INVENTOR(S) : Allen S. Katner

It is certified that error appears in the above-identified patent and that said Letters Patent are hereby corrected as shown below:

| $R_3$ | $R_4$ | $R_1$ | $R_2$ | Conc.[a] µg/ml | Percent Inhibition |
|---|---|---|---|---|---|
| H | H | H | $-CH_2-\phi-Cl$ | 400 | Unknown[d] |
|   |   |   |   | 40 | 90 |
|   |   |   |   | 30 | 87 |
|   |   |   |   | 20 | 78 |
|   |   |   |   | 15 | 68 |
|   |   |   |   | 10 | 47 |
|   |   |   |   | 5 | 36 |
| H | H | $-CH_3$ | $-CH_2-\phi-Cl$ | 360E | Unknown[d] |
|   |   |   |   | 36E | 85[e] |
| H | H | $-C_2H_5$ | $-CH_2-\phi-Cl$ | 27E | 74 |
| H | H | $-C_3H_7$ | $-CH_2-\phi-Cl$ | 360E | Unknown[d] |
|   |   |   |   | 40 | 59[f] |
| H | H | $-\phi$ | $-CH_2-\phi-Cl$ | 40 | 64 |
| 3-$CH_3$ | H | H | $-CH_2-\phi-Cl$ | 400 | Unknown[d] |
|   |   |   |   | 40 | 11.5 |
| H | 5-$CH_3$ | H | $-CH_2-\phi-Cl$ | 360E | Unknown[d] |
|   |   |   |   | 36E | 31[g] |
| H | 5-Cl | H | $-CH_2-\phi-Cl$ | 40 | Unknown[d] |
|   |   |   |   | 20 | 47[h] |

UNITED STATES PATENT AND TRADEMARK OFFICE
CERTIFICATE OF CORRECTION

PATENT NO. : 3,895,027
DATED : July 15, 1975
INVENTOR(S) : Allen S. Katner

It is certified that error appears in the above-identified patent and that said Letters Patent are hereby corrected as shown below:

| $R_3$ | $R_4$ | $R_1$ | $R_2$ | Conc., $\mu g/ml^a$ | Percent Inhibition |
|---|---|---|---|---|---|
| 3-CH$_3$ | 6-Cl | H | -CH$_2$-⟨O⟩-Cl | 360E | 19 |
| 4-Cl | 5-OCH$_3$ | H | -CH$_2$-⟨O⟩-Cl | 360E  40 | Unknown$^d$  65$^b$ |

Column 7, line 61, the phrase "400 μ/ml." should read -- 400 ug/ml. --.

Signed and Sealed this eighteenth Day of May 1976

[SEAL]

Attest:

RUTH C. MASON
Attesting Officer

C. MARSHALL DANN
Commissioner of Patents and Trademarks